A. Muller.
Treating Spelter.
Nº 32,840. Patented Jul. 16, 1861.
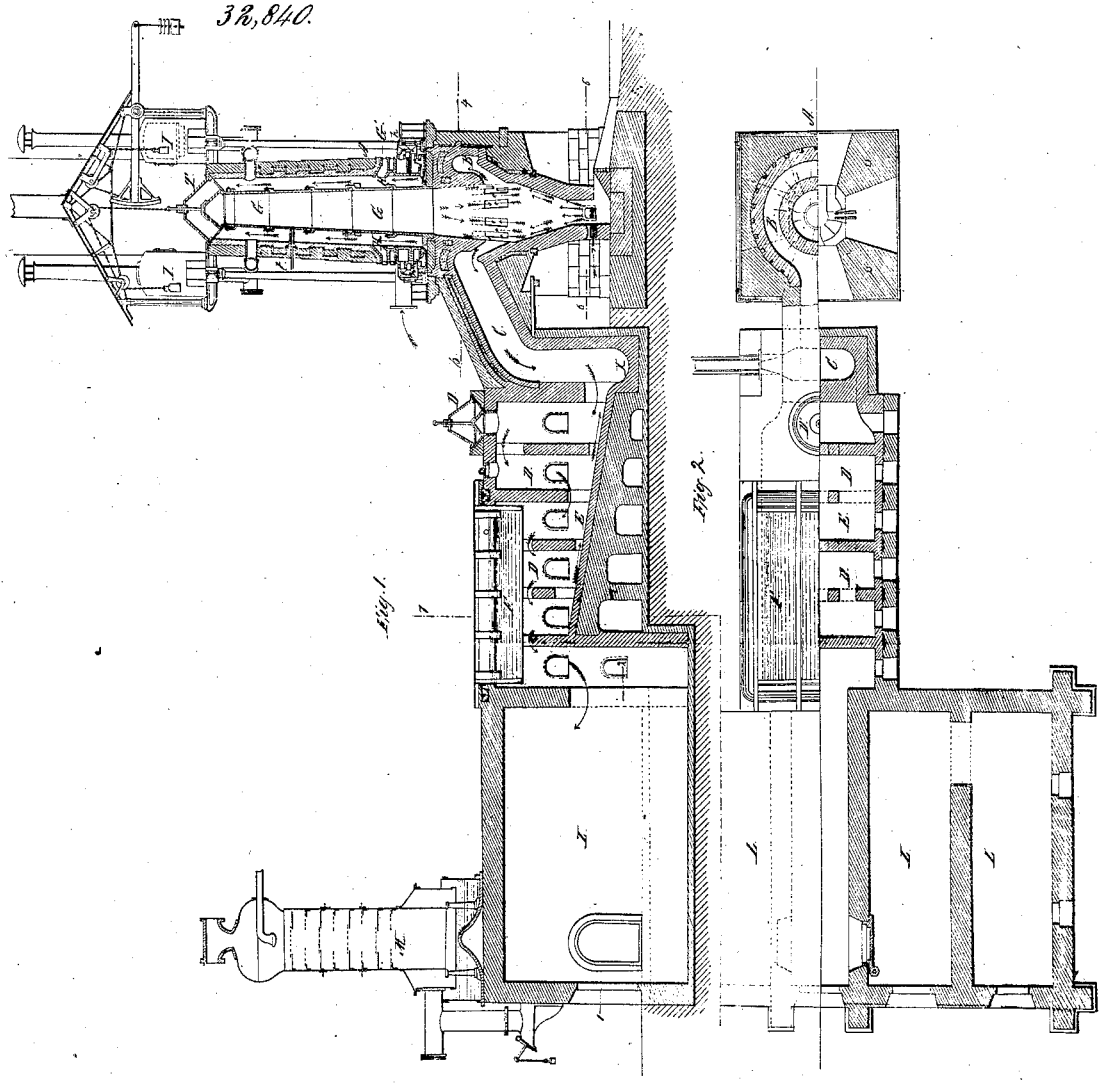
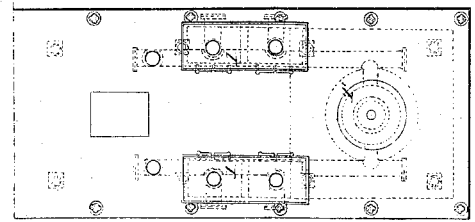
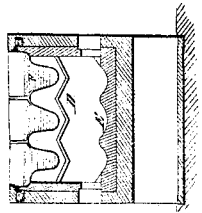

UNITED STATES PATENT OFFICE.

ADRIEN MULLER, OF PARIS, FRANCE.

IMPROVED FURNACE FOR TREATING ZINC AND OTHER ORES.

Specification forming part of Letters Patent No. 32,840, dated July 16, 1861.

*To all whom it may concern:*

Be it known that I, ADRIEN MULLER, of Paris, in the Empire of France, have invented certain new and useful Improvements in the Treatment of Zinc and other Ores; and I do hereby declare the nature of the said invention and in what manner the same is to be performed to be particularly described and ascertained in and by the following statement, reference being had to the accompanying drawings, and to the letters and figures marked thereon—that is to say:

The said invention relates to a peculiar system or mode of treating various ores, whether containing zinc or non-volatile metals, and to certain peculiar constructions and arrangements of apparatus employed in such treatment.

According to this invention it is proposed to treat the metallic oxides directly in contact with the fuel by the aid of a blast-furnace. The ores and fuel are well desiccated in suitable stoves arranged round the top of the furnace and heated by the waste gases, and are ground and agglomerated into blocks, each block containing besides the ore a sufficient quantity of wood, charcoal, or other combustible for reducing the ore, and a suitable quantity of quicklime to produce a good slag. The desiccation of the blocks is facilitated by placing them in open-work metal wagons, which allow the heat to circulate freely around their contents. The furnace is charged by means of a hopper placed at the top thereof, so constructed that a charge may be permitted to descend into the furnace without allowing at the same time any of the gases or products of combustion to escape. The vapors of zinc, with the products of combustion, pass off by a series of radiating passages into a condensing and refrigerating chamber, the top of which is provided with cold-water tanks to assist the refrigeration of the zinc-vapors. A portion of the carbonic oxide which enters the condenser with the vapor of zinc is subsequently directed, by the aid of a suitable fan, through a tubular blast-heater, for the purposes hereinafter described, while another portion is directed into an annular space which surrounds the upper part of the furnace, this space being bounded on its inner side by a slightly conical hollow cast-iron shaft forming a continuation of the upper part of the furnace and supporting the feeding-hopper, and on its outer side by the brick-work of the furnace, the annular space between being kept supplied with combustible gases, which become heated and then pass off to the drying-ovens above referred to. In order to check the upward draft of the furnace and cause the products of combustion to pass out at the radiating passages hereinbefore mentioned, it is proposed to introduce a current of carbonic oxide near the upper part of the furnace. Suitable gas-burners are employed in conjunction with means for admitting atmospheric air for facilitating the combustion of the gases in the blast-heating apparatus, and at the inlets for the gas into the annular space above referred to surrounding the inner shaft of the furnace. The fan which it is proposed to employ for exhausting the heated gases is so constructed that the inlet shall be considerably larger than the outlet, thereby obtaining greater pressure and force of blast. A constant current of cold water is passed through the spindle of the fan, which is made tubular for that purpose, to prevent overheating. In order to regulate the blast, a conical plug is contained inside the tuyere, and is capable of adjustment therein, so as to open or close more or less the mouth of the tuyere. The temperature of a retort may be indicated by a pyrometer, consisting of a metal bar laid in a recess on the surface of the blast-pipe, and resting on porcelain or other heat-resisting supports. This bar is fixed at one end, and is connected at its opposite end with a short lever-arm fast on a shaft, which carries a longer arm provided with a toothed segment on its free end. This segment gears into a pinion on the axis of a pointer or indicator, which indicates on a divided dial (by the expansion of the lear) the heat of the blast. The whole of the working parts of this pyrometer are inclosed in brick-work or other good fire-resisting medium. In the treatment of non-volatile ores—such as refractory iron ore—the products of combustion only will pass into the condensing-chambers.

And in order that the said invention may be fully understood, I shall now proceed more particularly to describe the same, and for that purpose I shall refer to the several figures on the sheet of drawings hereunto annexed, the same letters of reference indicating corresponding parts throughout all the figures.

Figure 1 of the drawings represents a longitudinal vertical section of the entire apparatus in complete working order. Fig. 2 is a corresponding sectional plan taken along the lines 1, 2, 3, 4, 5, and 6 in Fig. 1. Fig. 3 is a plan of the top of the blast-furnace, and Fig. 4 is a vertical transverse section taken along the line 7 and 8 in Fig. 1.

The hearth and tuyeres of the blast-furnace A may be constructed and arranged in the ordinary manner; but the boshes are less expanded and higher than usual. The outlets for the gas and vapor are disposed at the belly of the furnace, and open into an annular flue or chamber, B, which encircles the lower part of the body of the furnace. This flue communicates through the passage C with the condensing-chamber D, for the reception of the vapors of zinc. These chambers communicate with each other by means of openings made alternately in the upper and lower portions of their several division-walls, in order to obtain as long a circuit for the gases and vapors through the condensing-chambers as possible; and to render the process of condensation more regular, the first of these chambers is provided with a conical closing hopper, D', for the introduction of what is known as "zinc-fume" or finely-divided zinc. The hearth or floor E, which is common to all the chambers, is slightly inclined, in order that the condensed zinc may flow freely down it, apertures being left for that purpose at the foot of each division-wall. The roof of the last four chambers is composed of a galvanized iron water-tank, F, which, being kept constantly supplied with cold water, serves as refrigerator and greatly expedites the condensation of any remaining vapors of zinc. Large depositing-chambers L L are placed in communication with the condensing-chambers D, wherein, the current of gases being considerably retarded, the fume which has been carried along by the gases is allowed to deposit. Two sets of depositing-chambers are employed, and the gases are directed into them alternately, thereby affording facility for their being cleaned out occasionally. Each depositing-chamber is provided with a washer, M, in which a descending shower or stream of water acts upon the gases which enter therein from the next chamber, and, leaving the vapors of zinc, pass off into suitable apparatus. The zinc thus obtained flows off by the channel X, Fig. 2. The interior of the furnace, for a distance of two or three yards above the boshes, is built of fire-clay lumps, and the remainder, as far as the mouth, is composed of cast-iron made in short lengths or fulcrums G, joined together, as shown in the drawings. This part of the furnace is concentric with the outer brickwork, which rests upon the hollow crown G'. This crown is suitably hollowed out to receive the gas-burners H, which are united to it by double-elbow pipes $h$, which connect the interior of the crown with the gas-distributers, the whole forming an effective gas-consuming apparatus. Upon the platform at the mouth of the furnace are erected four ovens, I, for heating the fuel and the mineral by the aid of the gases which pass off from the furnace. The charge is introduced into the furnace through a cylindro-conical hopper, T, provided with a double bottom of a similar shape. This arrangement affords facility for introducing a charge without permitting the gases to escape. At about two-thirds the height of the furnace is fitted a small pipe, $t$, which admits a certain quantity of the gas which escapes from the condensing-chambers, so as to cause the gases or vapors arising from the charges to descend, and thereby check all upward drafts or currents. The blast-furnace is supplied with hot air from a tubular air-heating apparatus, which is itself heated by the combustible gases escaping from the condensing and depositing chambers. The furnace-charge is made up into the form of blocks, dried as above described, the blocks being composed of, first, the ore to be reduced; second, the proper quantity of wood, charcoal, or other combustible necessary for the reduction of such ore; and, third, a sufficient quantity of lime to form a good cinder. The reduction of the ore in the furnace being thus accomplished by the contact with the carbon, the carbonic-oxide gas will be unnecessary for this operation. The quicklime will combine with the gangue of the ore to form the various silicates. Thus, by the use of these blocks of ore, fuel, and lime combined together, the transformation of carbonic oxide into carbonic acid, and the disengagement of carbonic acid, which always results from the use of castine or flux, are prevented. By this system, therefore, a gaseous current completely free from carbonic-acid gas is obtained, while a considerable temperature is maintained in the furnace.

I may observe, in conclusion, that when the metallic zinc descends into the oxidizing-zone of the furnace, or when the oxide is carried along by a gaseous current, which amounts to the same, the current or draft produced by the combustion carries along with it considerable quantities of oxide. If the current traverses over or through masses of incandescent fuel, whether coke or wood charcoal, the particles of oxide carried along with it are almost immediately transformed into metallic vapor by parting with their oxygen to the fuel, which in this case performs the functions of a reducer. The charcoal, by reason of its great porosity, has this property in a high degree.

Various arrangements of apparatus may be employed for the attainment of the end in view, which is to cause the products of combustion and vapors of zinc to pass over or through as large a surface as possible of incandescent fuel, in order that should such products of combustion and vapors of zinc carry along with them any unreduced particles these particles will undergo their reduction during their passage through or over the incandescent fuel.

Having now described and particularly ascertained the nature of the said invention and the manner in which the same is or may be used or carried into effect, I would observe, in conclusion, that what I consider to be novel and original, and therefore claim as my invention, is—

The construction, arrangement, and combination of apparatus employed in the reduction or treatment of zinc and other ores, as hereinbefore described.

In testimony whereof I have signed my name to this specification before two subscribing witnesses.

A. MULLER.

Witnesses:
 S. HINMAN,
 GEO. HUTTON.